US006475586B1

(12) United States Patent
Ikawa

(10) Patent No.: US 6,475,586 B1
(45) Date of Patent: Nov. 5, 2002

(54) UNIDIRECTIONALLY VISIBLE PRINTING MEMBER

(75) Inventor: Osamu Ikawa, Yawata (JP)

(73) Assignee: General Co., Ltd., Osaka (JP)

(*) Notice: Subject to any disclaimer, the term of this patent is extended or adjusted under 35 U.S.C. 154(b) by 0 days.

(21) Appl. No.: 09/572,941

(22) Filed: May 18, 2000

(30) Foreign Application Priority Data

May 24, 1999 (JP) ........................................ 11-143644
Jan. 17, 2000 (JP) ...................................... 2000-008281

(51) Int. Cl.[7] ................................................ B32B 3/10

(52) U.S. Cl. ...................... 428/40.1; 40/442; 428/42.1; 428/42.2; 428/42.3; 428/43; 428/137; 428/138; 428/204; 428/207

(58) Field of Search .............................. 428/40.1, 42.1, 428/42.2, 42.3, 43, 207, 204, 137, 138; 40/442

(56) References Cited

U.S. PATENT DOCUMENTS 5,525,177 A 6/1996 Ross ......................... 156/240
5,609,938 A * 3/1997 Shields ....................... 428/138
5,858,155 A * 1/1999 Hill ............................ 156/230

* cited by examiner

*Primary Examiner*—Nasser Ahmad
(74) *Attorney, Agent, or Firm*—Fitzpatrick, Cella, Harper & Scinto

(57) ABSTRACT

A unidirectionally visible printing member includes a light-transmitting base material, a pressure-sensitive adhesive layer having a re-releasable pressure-sensitive adhesive, formed on the base material, and a sheet member including an opaque layer and an image-forming layer and having through-cuts, formed on the pressure-sensitive adhesive layer. The sheet member, when peeled, is capable of remaining partly on the pressure-sensitive adhesive layer in conformity with the cuts, and the pressure-sensitive adhesive layer is capable of remaining on the base material and being uncovered at the part other than the part where the sheet member remains on the pressure-sensitive adhesive layer.

7 Claims, 4 Drawing Sheets

UNIDIRECTIONALLY VISIBLE PRINTING MEMBER

BACKGROUND OF THE INVENTION

1. Field of the Invention

This invention relates to a unidirectionally visible (or image-visible) printing member which brings about optical effects different from each other on both sides. More particularly, it relates to a unidirectionally visible printing member in which any images such as characters and figures printed on the surface are visible from the outside, but are invisible from the inside through which the exterior can be seen, which is usable for decoration, advertisement and so forth.

2. Related Background Art

Sheets so designed that any images such as characters and figures printed thereon are visible from the outside when attached to, e.g., windowpanes of automobiles or shops but the images are invisible and the outside view can be seen through attract attention as new advertisement mediums. For example, as shown in FIG. 1A, a sheet having a dark-color layer 103 on its one side and an image 104 formed on its opposite side is provided with a large number of minute holes 105 and then, after a release sheet 101 has been peeled off, is attached to, e.g., glass 106 with an adhesive provided on the dark-color side (FIG. 1B) as known in the art. Also proposed is a method in which a base pattern having a black or dark-color stripe or small-hole pattern is provided on a transparent film and images are printed so as to cover the base pattern completely.

These methods, however, have problems such that very strict registration (positional adjustment) must be made at the time of printing, or an order must be given to printing traders because a means such as gravure printing or offset printing is used resulting in a large printing lot and taking considerable time and cost for preparation.

In instances where the sheets are attached to windowpanes of automobiles or shops as advertisement mediums, the image surfaces must face the outside of a car or the outdoors. Conventional sheets, however, are processed to make them adhesive (adhesive-processed) on the dark-color side, and hence must necessarily be attached to the outside of the windowpane. Hence, there has been a problem that the sheets attached onto windowpanes may be affected by, e.g., rainfall or car washing to tend to cause a deterioration due to water or detergents to become damaged. In order to prevent such a deterioration, it is possible to apply a cover film over the whole area of the surface on which images have been formed. This, however, complicates steps and also requires a cost, and hence is not practical.

On the one hand, in order to attach the sheet to the windowpane on its inside, the sheet must be adhesive-processed on the side of printed images. It, however, is difficult to print images on the surface having been adhesive-processed. It has also been difficult in view of steps to apply pressure-sensitive adhesive on the printed images.

SUMMARY OF THE INVENTION

The present invention was made in order to solve such problems. Accordingly, an object of the present invention is to provide a unidirectionally visible printing member which has simple construction and can be prepared at a low cost, and which can be handled so simply that even ordinary consumers can readily print images thereon by means of commercially available printers and attach it as a printed member to a windowpane and the like.

Another object of the present invention is to provide a unidirectionally visible printing member with which image-formed sheets can be attached to glass on the inside of automobiles, shops and so forth, having hitherto been difficult, and may hardly be affected by outdoor conditions.

The unidirectionally visible printing member of the present invention comprises a light-transmitting base material, a pressure-sensitive adhesive layer comprised of a re-releasable pressure-sensitive adhesive, formed on the base material, and a sheet member having an opaque layer and an image-forming layer and having through-cuts which pass through the image-forming layer and the opaque layer, formed on the pressure-sensitive adhesive layer; the sheet member, when peeled, being capable of remaining partly on the pressure-sensitive adhesive layer in conformity with the cuts, and the pressure-sensitive adhesive layer being capable of remaining on the base material and being uncovered at the part other than the part where the sheet member remains on the pressure-sensitive adhesive layer.

DESCRIPTION OF THE PREFERRED EMBODIMENTS

Figure 1A:
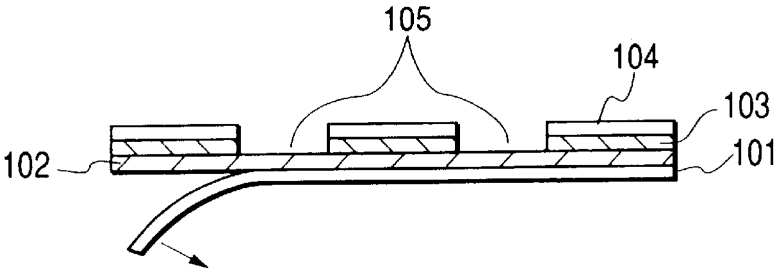
FIG. 1A and FIG. 1B are cross-sectional views showing a conventional unidirectionally visible printing member.
Figure 1B:
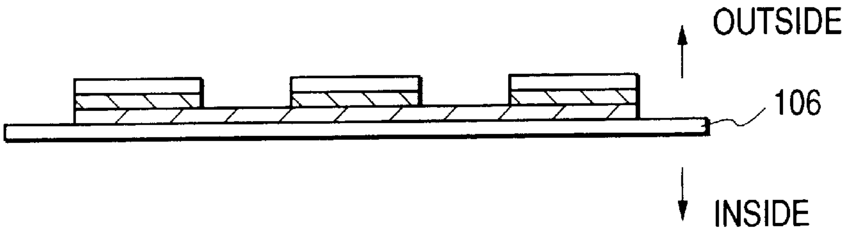

The unidirectionally visible printing member of the present invention comprises a light-transmitting base material, a pressure-sensitive adhesive layer comprised of a re-releasable pressure-sensitive adhesive, formed on the base material, and a sheet member having an opaque layer and an image-forming layer and having through-cuts which pass through the image-forming layer and the opaque layer, formed on the pressure-sensitive adhesive layer. In the present invention, the sheet member, when peeled, is capable of remaining partly on the pressure-sensitive adhesive layer in conformity with the cuts, and the pressure-sensitive adhesive layer is capable of remaining on the base material and being uncovered at the part other than the part where the sheet member remains on the pressure-sensitive adhesive layer.

The light-transmitting base material used in the present invention may be any of those which transmit light, and may preferably be a transparent or semitransparent film type one. For example, usable are films of polyvinyl chloride, polypropylene, nylon, polyester and polyvinyl alcohol.

As the re-releasable pressure-sensitive adhesive used to form the pressure-sensitive adhesive layer, commercially available pressure-sensitive adhesives may be used. For example, it may include pressure-sensitive adhesives of rubber/pressure-sensitive adhesive resin types or acrylic types. Depending on the form in which it is used, any of a solvent type, an emulsion type and a hot-melt type of these may be used. Any of these pressure-sensitive adhesives may be coated on the substrate by means of a reverse coater, a gravure coater, a fountain dye coater, an air knife coater, a Mayer coater, a Comma coater or the like.

The sheet member having an image-forming layer and an opaque layer may be any of those having properties such that images are printable on its surface and meanwhile the surface side is invisible from the back side. It may be a sheet member having light-screening properties or reflecting properties on the back. For example, printable paper or film, or a printable laminate of paper and film may be used. On the back of any of these, a black, a dark-color or a metallic-color ink or a coating material may be coated to impart the light-screening properties or reflecting properties. Alternatively, any of the above materials on the back of which a paper or film having light-screening properties or reflecting properties has been laminated may be used. As the paper, usable are wood-free paper, coated paper, synthetic paper, or converted paper improved in ink-fixing performance, such as paper for ink-jet printers; and as the film, polyethylene terephthalate, nylon or vinyl chloride formed into film, or films converted to have an improved ink-fixing performance. A laminate of such paper and film may also be used.

Thickness of the sheet member may differ depending on the case where paper is used and the case where film is used, and may preferably be as small as possible as long as images are sharply printable, because the uncovered pressure-sensitive adhesive layer of the printing member may more readily adhere to the adhering target surface of, e.g., a windowpane.

The pressure-sensitive adhesive is coated on the substrate to form the pressure-sensitive adhesive layer, and the opaque layer side of the sheet member is brought into close contact with the surface of this pressure-sensitive adhesive layer. Thereafter, cuts made through the sheet member from its surface to the opaque layer, i.e., what is called half cuts, are provided in the sheet member. Thus, the printing member of the present invention can be prepared. The cuts (half cuts) can be formed by conventional methods using, e.g., a cutting machine, a Thompson cutter, a press marker or a laser cutter.

Figure 3A:
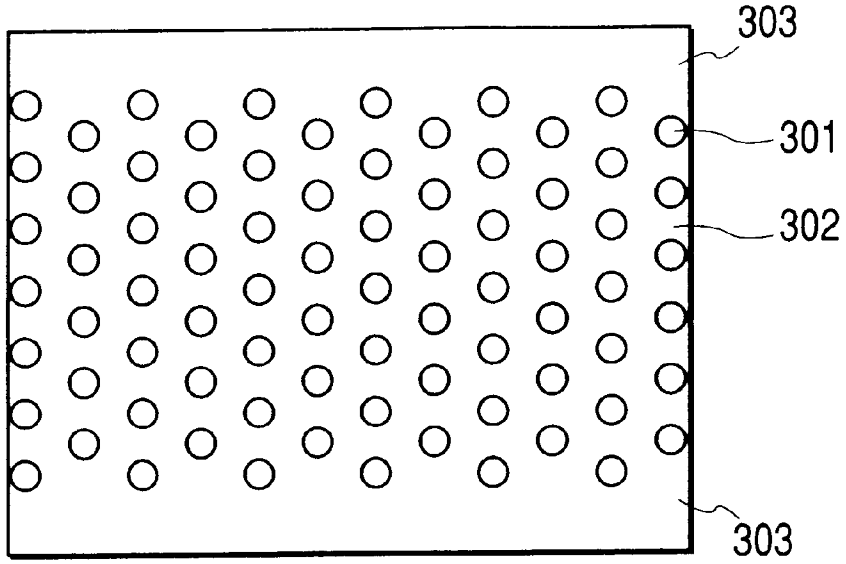
FIG. 3A and FIG. 3B are plan views showing an example of the cuts made in the printing member of the present invention.
Figure 3B:
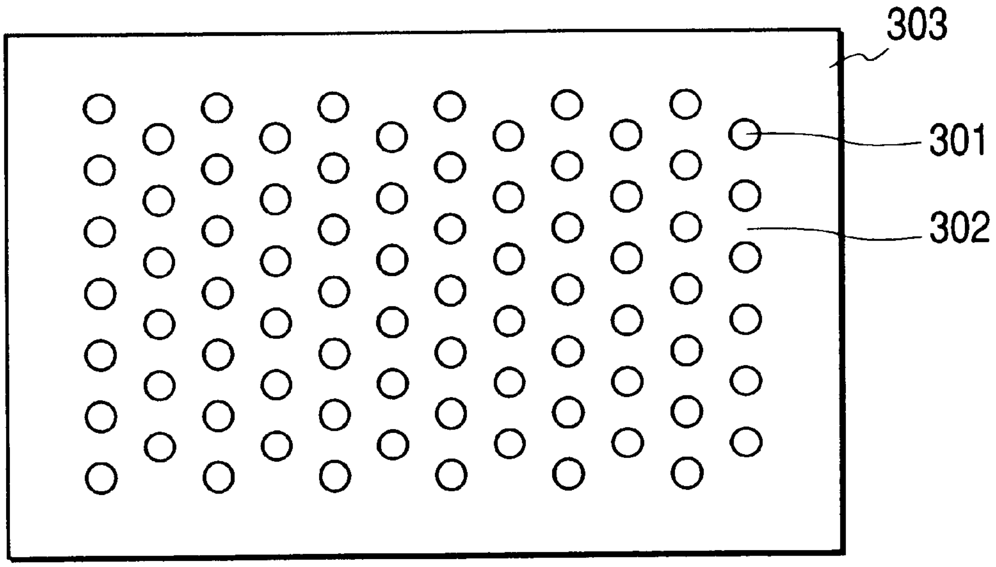

The cuts may preferably be circular or strip. What is herein meant by "circular" may embrace not only circles but also ovals. Also, the shape for "strip" may be the shape of straight lines, zigzags, waves, or combination of any of these, any of which may be employed. Incidentally, circular or strip portions remaining in the sheet member after it has been peeled may preferably be in such a fashion that they are individually dependent from adjacent remaining portions. FIGS. 3A and 3B show an embodiment in which circular cuts are provided, and FIGS. 4A and 4B an embodiment in which strip cuts are provided.

Figure 4A:
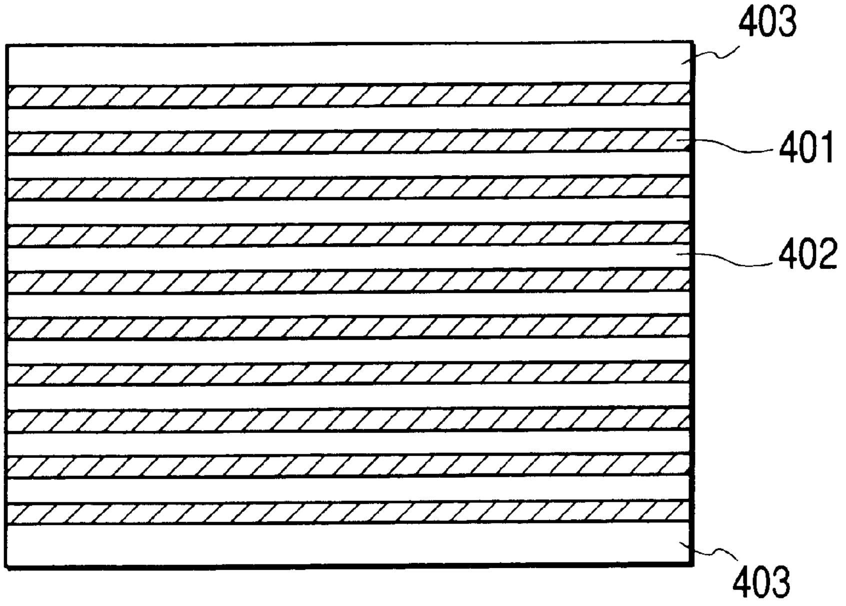
FIG. 4A and FIG. 4B are plan views showing another example of the cuts made in the printing member of the present invention.
Figure 4B:
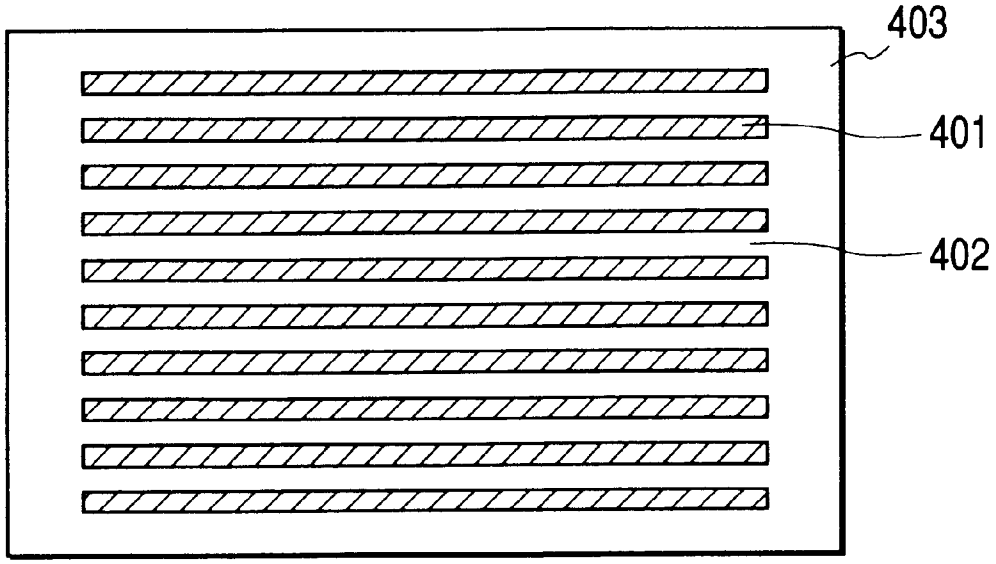
Figure 6A:
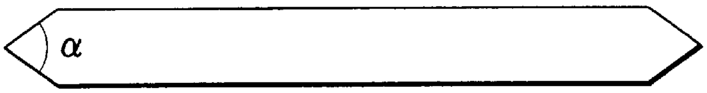
FIG. 6A and FIG. 6B are enlarged views of an example of a cut made in the printing member of the present invention.
Figure 6B:
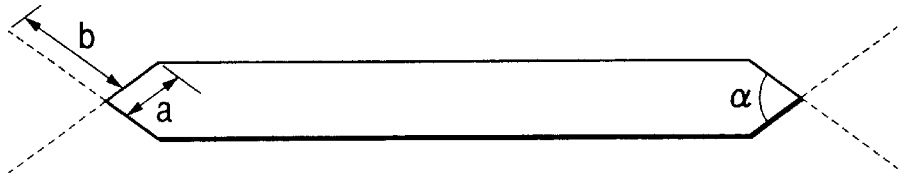
Figure 7A:
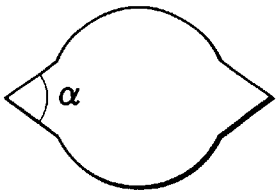
FIG. 7A and FIG. 7B are enlarged views of another example of a cut made in the printing member of the present invention.
Figure 7B:
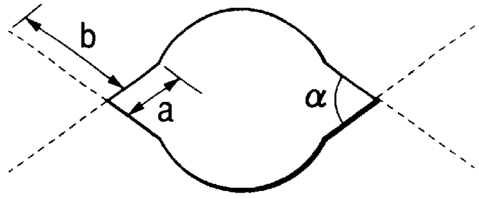

FIG. 6A shows a modification of the straight-line strip cuts like those shown in FIGS. 4A and 4B, and is an enlarged view of one cut having such a shape that the both ends of its short sides have corners. FIG. 7A shows circular cuts in which corners like those in FIG. 6A are provided, and is also an enlarged view of a cut shape. FIGS. 6B and 7B each show an embodiment in which the half cuts are provided in the directions where the cornered short sides are extended, in respect of the embodiments shown in FIGS. 6A and 6B, respectively.

At least at opposite two sides of the outer boundary of the printing member of the present invention, the sheet member may preferably be provided, in a certain width, with zones where no cuts are made. FIG. 3A and FIG. 4A each show embodiments in which no cuts are provided at opposite two sides, and FIG. 3B and FIG. 4B each show embodiments in which no cuts are provided at outer-boundary four sides. In these Figures, reference numerals 303 and 403 are the zones where no cuts are provided. The sheet member is peeled at one end of its zones where no cuts are provided, to make the pressure-sensitive adhesive layer uncovered, and the pressure-sensitive adhesive layer is, at its uncovered portions, brought into adhesion to the adhering target surface on the inside of, e.g., a windowpane. Thus the printing member is fixed onto the adhering target surface. The zones where no cuts are provided may preferably have an area of from 1 to 40% based on the whole area of the printing member. Incidentally, the zones where no cuts are provided may have width different from one another.

Reference numeral 301 in FIGS. 3A and 3B and reference numeral 401 in FIGS. 4A and 4B are the portions remaining in the sheet member after it has been peeled. Portions 302 and marginal zones 303 in FIGS. 3A and 3B and portions 402 and marginal zones 403 in FIGS. 4A and 4B are the portions where the pressure-sensitive adhesive layer is uncovered. Needless to say, the pressure-sensitive adhesive layer can be made to adhere to the adhering target surface also at such uncovered portions 302 and 402 . Especially when the printing member has a large area, it may be made to adhere to the adhering target surface not only at the marginal zones but also at the pressure-sensitive adhesive layer uncovered portions other than the marginal zones so that the whole printing member can be made to adhere more uniformly. In such a case, the pressure-sensitive adhesive layer uncovered portions other than the marginal zones may have an area of from 10 to 70%, and preferably from 40 to 60%, based on the whole area of the portions other than the marginal zones, where more uniform adhesion can be attained. If this area percentage is too small, no sufficient adhesion may be attained or the exterior may be seen through with difficulty. If on the other hand it is too large, there is a possibility that the image-forming part is too small. This area percentage may appropriately be selected taking account of the type of pressure-sensitive adhesives, the thickness of sheet members, the thickness of light-transmitting base materials and so forth.

In the case where the cuts are in the shape of strips or circles having corners as shown in FIGS. 6A and 6B or FIGS. 7A and 7B, the sheet member can more easily be peeled than those having no corners. In particular, this is effective for printing members having a large area. Each corner may have an angle a that satisfies the relationship of $0° < \alpha < 180°$. Also, as shown in FIG. 6B or FIG. 7B, half cuts provided in the corner-extended directions make it easier to peel the sheet member. Here, the half cuts provided in the corner-extended directions may preferably have a length b that is twice or less, and particularly preferably 0.5 time to 1.5 times, the length a of one side of the short sides. If the length b is more than twice the length a, the shape of images which are to remain may be restricted and also the lines of the half cuts in the corner-extended directions may overlap, so that unwanted unnecessary matters may remain. If the length of b is less than 0.5 time the length of a, it may become difficult to peel the printing member with an increase in its area, resulting in a poor operability compared with the case where the half cuts are made.

When the printing member has a large area or is attached to a place which is not flat, a sheet having a transparency of 60% or more and a pressure-sensitive adhesive strength of 100 gf/cm or below may be attached to part of the printing member between it and the adhering target surface (the pressure-sensitive adhesive strength is determinable according to JIS Z0237, "8. Adhesive Strength", to find 180-degree peel adhesion to a test plate).

Figure 2A:
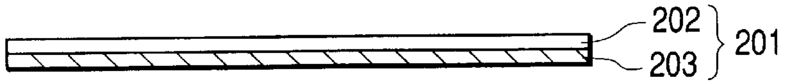
FIG. 2A, FIG. 2B and FIG. 2C are cross-sectional views showing steps for preparing the printing member of the present invention.

Preparation of the printing member according to the present invention will be described with reference to FIGS. 2A to 2C.

First, a base material 205 comprising a light-transmitting film of polyethylene terephthalate, vinyl chloride or the like and as an image-forming layer 202 , paper, film or a laminate of these, having a printable surface, are made ready for use.

Next, a black, a dark-color or metallic-color ink or a coating material is coated on the back of this paper or the like, or a paper or film having light-screening properties or reflecting properties is attached to the back thereof, to form an opaque layer 203. Thus, a sheet member 201 having a printable surface on the surface and having light-screening properties or reflecting properties on the back is formed (FIG. 2A).

Figure 2B:
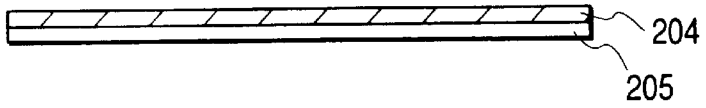

Next, a pressure-sensitive adhesive of, e.g., an acrylic and solvent type is coated on the base material 205 by means of a reverse coater or the like to form a pressure-sensitive adhesive layer 204 (FIG. 2B). On this pressure-sensitive adhesive layer 204, the above sheet member 201 is overlaid so as for the opaque layer 203 to come into close contact with the pressure-sensitive adhesive layer 204 . In order to prevent the ink in the opaque layer 203 from migrating to the pressure-sensitive adhesive layer 204 to lower pressure-sensitive adhesive properties, a barrier layer (not shown) may be provided between the opaque layer 203 and the pressure-sensitive adhesive layer 204.

Figure 2C:
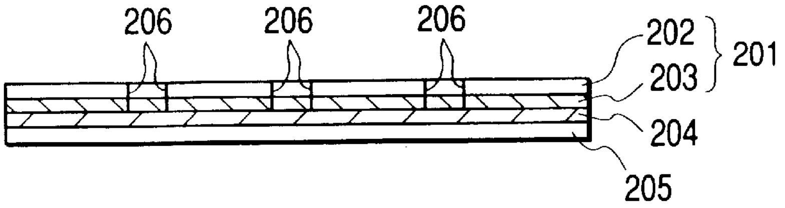

Next, using a commercially available cutting machine, circular or strip cuts are made through the sheet member 201 (FIG. 2C). Here, as shown in FIG. 3A or FIG. 4A, zones 303 or 403 where no cuts are made are provided at opposite two sides of the outer boundary of the sheet member; or as shown in FIG. 3B or FIG. 4B, at four sides of the outer boundary of the sheet member. For example, in the case of a printing member with an A3 size or smaller, the zones where no cuts are made are provided in a width of from 5 to 40 mm from each end of the four sides or opposite two sides of the outer boundary of the sheet member; and in the case of a printing member with an A3 size or larger, from 5 to 100 mm.

In the case where circular cuts are made in the sheet member, the cuts are so made that they remain individually dependently from adjacent circular portions. In this case, circles may preferably be formed each in a diameter of from 0.5 to 10 mm and in such a fashion that their distance from the adjacent circular portions is 10 to 150% of the diameter of each circular portion.

In the case where strip cuts are made in the sheet member, the cuts may preferably be so made that remaining strip portions of the sheet member each have a width of from 0.5 to 10 mm and in such a fashion that their distance from the adjacent strip portions is 10 to 150% of the width of each strip portion. Also, the cuts may preferably be so made that, when the sheet member is peeled, strip cuts can be peeled in the state they link at every second strip cut, in other words, the strip cuts remain at every second strip cut.

If the circular or strip portions have a diameter or width smaller than the lower limit of the above range, the printing member may be worked with difficulty. If on the other hand they have a diameter or width larger than the upper limit of the above range, the unit portions of the image-forming part for printing may be so large as to be poor-looking and the exterior may be seen through with difficulty.

If the distance between adjacent portions is smaller than the lower limit of the above range, the printing member may be worked with difficulty. Also, the exterior may be seen through with difficulty because of diffraction of light. If on the other hand the distance is larger than the upper limit of the above range, printed images may be recognized with difficulty.

How to really use the printing member thus prepared will be described below.

First, on a printer, the printing member is so set that images can be printed on its printable surface, and any desired images are printed. Next, the sheet member is peeled at its one end. Thus, the printing member becomes a printed member in which the portions corresponding to the cuts in the sheet member remain and the pressure-sensitive adhesive layer stands uncovered at its portions other than the portions having remained. This may be used on, e.g., the windowpane of an automobile or shop in such a way that its surface on which images have been formed is brought into contact with the glass surface from the inside to make the uncovered pressure-sensitive adhesive layer adhere to the glass surface.

Figure 5A:
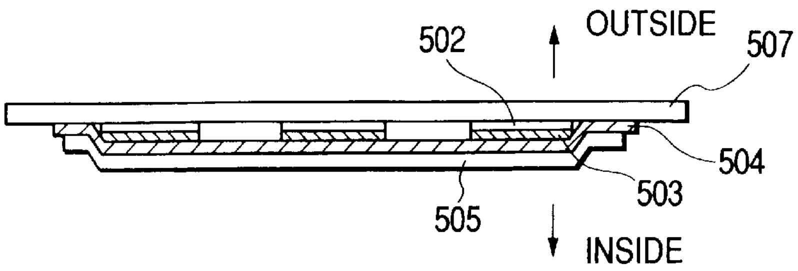
FIG. 5A and FIG. 5B are cross-sectional views of an instance where the printing member of the present invention has been attached as a printed member to a glass surface.
Figure 5B:
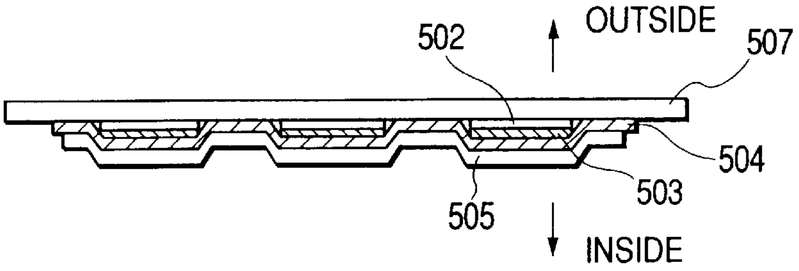

FIG. 5A shows an instance where the printing member as a printed member has been made to adhere to the adhering target surface of glass 507 via the pressure-sensitive adhesive layer 504 only at its marginal portions; and FIG. 5B, an instance where it has been made to adhere to the adhering target surface of glass 507 via the pressure-sensitive adhesive layer 504 both at its marginal portions and its portions other than the marginal portions. In FIGS. 5A and 5B, reference numeral 502 denotes an image-forming layer; 503, an opaque layer; 504, a pressure-sensitive adhesive layer and 505, a base material. Incidentally, the printing member may be pressed against the glass surface from the base material side by means of a roller or the like. This enables closer adhesion between the glass surface and the pressure-sensitive adhesive layer 504, and brings about an improvement in adhesion of the printing member.

Thus, a state can be accomplished where the printed images are visible from the outside of a windowpane or the like, but are invisible from the inside, while the exterior can be seen through the part other than sheet member remaining portions.

EXAMPLES

The present invention will be described below in greater detail by giving Examples.

Example 1

On the top surface of a white polyethylene terephthalate (PET) film of 50 $\mu$m thick, an emulsion having the following formulation was coated in a thickness of 30 $\mu$m to form an image-forming layer.

| Formulation: | (by weight) |
|---|---|
| Self-crosslinking acrylic copolymer emulsion (solid content.: 60%) | 7 parts |
| Cationic acrylate copolymer resin emulsion (solid content: 40%) | 8 parts |
| Silica | 7 parts |
| Methanol | 26 parts |
| Water | 52 parts |

Subsequently, on the back of this PET film, a black ink was coated over the whole area to obtain a sheet member. Next, a transparent PET film of 50 μm thick was made ready for use as a light-transmitting base material. On one-side whole area of this PET film, POLISIC 610 (available from Sanyo Chemical Industries, Ltd.) was uniformly coated by means of a reverse coater to form a pressure-sensitive adhesive layer. Then, these two films were put together in such a way that the black side of the white PET film came into close contact with the pressure-sensitive adhesive layer of the transparent PET film. Thereafter, this was cut in A4 size.

Next, except that at the outer-boundary opposite two sides on the long-side sides the cuts were not provided in a width of 5 mm for each side, using a cutting machine, strip cuts of 1.5 mm wide each were made through the sheet member so as not to reach the pressure-sensitive adhesive layer. The cuts were so made that the distance between one strip portion and its adjacent strip portion was 1.0 mm. Thus, a printing member according to the present invention was prepared.

In the present Example, the total area of the outer-boundary two-side zones where no cuts were provided was 4.8% of the whole area of the printing member. Also, the area of the strip portions which were to remain on the pressure-sensitive adhesive layer was 59.6% based on that part excluding the two-side zones where no cuts were provided.

Example 2

A printing member was prepared in the same manner as in Example 1 except that at the outer-boundary opposite two sides on the long-side sides the cuts were not provided in a width of 40 mm for each side (the total area of the zones where no cuts were provided was 38.1% of the whole), and the width of each strip portion was set to be 10 mm and the distance between adjacent strip portions 1 mm.

Example 3

A printing member was prepared in the same manner as in Example 1 except that the both ends of each cut of 1.5 mm wide were made to have the shape as shown in FIG. 6A.

Example 4

A printing member was prepared in the same manner as in Example 1 except that both ends of each cut of 1.5 mm wide were made to have the shape as shown in FIG. 6B and the length b of the extended half cut was set equal to the short-side length a.

Example 5

A printing member was prepared in the same manner as in Example 4 except that the printing member was in A2 size.

Example 6

A printing member was prepared in the same manner as in Example 5 except that the length b of the extended half cut was set 1.5 times the short-side length a.

Example 7

A printing member was prepared in the same manner as in Example 5 except that the length b of the extended half cut was set twice the short-side length a.

Comparative Example 1

A printing member was prepared in the same manner as in Example 1 except that at the outer-boundary opposite two sides on the long-side sides the cuts were not provided in a width of 0.8 mm for each side (the total area of the zones where no cuts were provided was 0.77% of the whole).

Comparative Example 2

A printing member was prepared in the same manner as in Comparative Example 1 except that the cut width of each strip portion was set to be 12 mm and the distance between adjacent strip portions 1 mm. In this case, the distance between adjacent strip portions was 8.3% of the strip portions.

Comparative Example 3

A printing member was prepared in the same manner as in Example 5 except that the length b of the extended half cut was set 3 times the short-side length a.

Evaluation Test and Test Results

The printing members prepared in Examples 1 to 7 and Comparative Examples 1 to 3 were each set on a printer (PM-3000C, trade name; manufactured by Seiko Epson K.K.) so as to be printable on the white surface, and images were printed. Thereafter, each sheet member was peeled at its one end. Thus, some portions corresponding to the cuts in the sheet member were made to remain and meanwhile the pressure-sensitive adhesive layer was made to become uncovered at its portions other than the portions having remained. Using a roller, this was uniformly pressed against a flat windowpane whose inner surface had been wiped with ethanol to remove any stains and oily matter, in such a way that its surface on which images were formed was brought into contact with the glass surface from the inside to make the uncovered pressure-sensitive adhesive layer adhere to the glass surface. Incidentally, windowpanes selected faced south and were at a place fall of sunshine in the daytime.

The printing members thus attached as printed members to windowpanes were observed on the outside and inside of the windowpanes. In the case of the printing members of Examples 1 to 7 and Comparative Examples 1 and 3, printed images were recognizable from the outside, and also the images were not recognizable from the inside and the outside view was well seen. Thus, unidirectional visibility was confirmable. On the other hand, in the case of the printing member of Comparative Example 2, printed images were recognizable from the outside, but the outside view was seen with difficulty compared with Examples 1 and 2 and Comparative Example 1.

The printing member of Example 3 showed a better operability than the printing member of Example 1.

Also, the printing member of Example 4 showed a better operability than the printing member of Example 3. In comparison between the printing members of Examples 4 and 5, the latter printing member of Example 5 showed a low operability correspondingly to the area which was larger than that of the former. The printing member of Example 6 showed a better operability than the printing member of Example 5. The printing member of Example 7 showed a much better operability than the printing member of Example 6. In comparison between the printing members of Example 7 and Comparative Example 3, the printing member of Comparative Example 3 had to be carefully peeled because of the extended half cuts overlapping too much, resulting in a low operability.

Next, the state of printing members after they were left for a month in this state as printed members was observed. As a result, no changes were seen in the printing members of Examples 1 and 2, which maintained the state where they were initially attached. On the other hand, the printing members of Comparative Examples 1 and 2 came off from the glass at their margins, and also the printing members came off from the glass here and there and stood lifted. The printing members of Examples 3 to 7 and Comparative Example 3 showed the same results as the printing member of Example 1.

As described above, the printing member of the present invention, when attached as a printed member to a transparent windowpane or the like, images such as characters and figures printed on its surface are visible from the outside, but are invisible from the inside, while the exterior can be seen through. Thus, it is usable for decoration, advertisement and so forth. Also, since it has a simple construction, and can be prepared at a low cost. Moreover, even ordinary consumers can readily print images thereon by means of commercially available printers and attach it as a printed member to, e.g., a windowpane of an automobile or house. Thus, they can enjoy decoration of their own making.

Where it is attached to the windowpane from the surface of which stains or oily matters have been removed, it can be peeled and again and again attached because a re-releasable pressure-sensitive adhesive is used. Thus, they can enjoy decoration while changing places where it is attached. Where it has become useless, it can readily be peeled without contaminating the adhering target surface such as glass surface.

In addition, since the printing member on which images have been formed as a printed member is attached to the windowpane on its inside, it may hardly be affected from the outside by water, detergents and so forth due to, e.g., car washing and rainfall, and can maintain the initial state where it is attached. Accordingly, even when used in advertisement, the effect of advertisement can be kept over a long period of time.

What is claimed is:

1. A unidirectionally visible printing member, comprising:

a light-transmitting base material;

a pressure-sensitive adhesive layer comprised of a re-releasable pressure-sensitive adhesive, formed on said base material; and a sheet member having an opaque layer and an image-forming layer and having through-cuts which pass through said image-forming layer and said opaque layer, formed on said pressure-sensitive adhesive layer, wherein said sheet member, when peeled, remains partly on said pressure-sensitive adhesive layer in conformity with the cuts, and said pressure-sensitive adhesive layer remains on said base material and is uncovered at portions other than where said sheet member remains on said pressure-sensitive adhesive layer.

2. The unidirectionally visible printing member according to claim 1, wherein after said sheet member is peeled said pressure-sensitive adhesive layer is uncovered at least at two opposite sides of an outer boundary of the unidirectionally visible printing member, and the total area of uncovered zones of the two opposite sides is from 1% to 40% of the entire area of the unidirectionally visible printing member.

3. The unidirectionally visible printing member according to claim 2, wherein width of said pressure-sensitive adhesive layer uncovered at the outer boundary of the unidirectionally visible printing member is from 5 to 50 mm for each side in the case of A3 size or smaller, and from 5 to 100 mm for each side in the case of larger than A3 size.

4. The unidirectionally visible printing member according to claim 1, wherein the cuts have the shape of a large number of circles or strips.

5. The unidirectionally visible printing member according to claim 1, wherein the cuts are a large number of substantially circular or strip cuts shaped to have corners at their opposite sides.

6. The unidirectionally visible printing member according to claim 1, wherein the cuts are a large number of substantially circular or strip cuts shaped to have corners at their opposite sides and having half cuts in directions where cornered short sides are extended.

7. The unidirectionally visible printing member according to claim 6, wherein the half cuts are each in a length twice or less the length of each side forming the corners.

* * * * *

UNITED STATES PATENT AND TRADEMARK OFFICE

CERTIFICATE OF CORRECTION

PATENT NO. : 6,475,586 B1
DATED : November 5, 2002
INVENTOR(S) : Osamu Ikawa

It is certified that error appears in the above-identified patent and that said Letters Patent is hereby corrected as shown below:

Column 4,
Line 55, "a" should read -- α --.

Column 8,
Line 50, "fall" should read -- full --.

Signed and Sealed this

Tenth Day of June, 2003

JAMES E. ROGAN
*Director of the United States Patent and Trademark Office*